United States Patent [19]
Laakmann

[11] Patent Number: 4,688,893
[45] Date of Patent: Aug. 25, 1987

[54] HOLLOW WAVEGUIDE HAVING PLURAL LAYER DIELECTRIC

[75] Inventor: Katherine D. Laakmann, Laguna Niguel, Calif.

[73] Assignee: Laakmann Electro-Optics, Inc., San Juan Capistrano, Calif.

[21] Appl. No.: 713,150

[22] Filed: Mar. 18, 1985

[51] Int. Cl.$^4$ ............................................. G02B 6/20
[52] U.S. Cl. .............................. 350/96.32; 350/96.34
[58] Field of Search ............... 350/96.29, 96.30, 96.32, 350/96.34, 96.1

[56] References Cited

U.S. PATENT DOCUMENTS

| 3,436,141 | 4/1969 | Comte ............................ 350/96.32 |
| 4,068,920 | 1/1978 | Bass et al. .................... 350/96.32 X |

OTHER PUBLICATIONS

Miyagi et al., *Applied Optics*, 20(24), Dec. 15, 1981, "Losses and Phase Constant Changes Caused by Bends in the General Class of Hollow Waveguides for the Infrared," pp. 4221–4226.
Miyagi et al., *Transactions of the IEEE*, vol. MTT-32, No. 5, May 1984, "Wave Propagation and Attenuation in the General Class of Circular Hollow Waveguides with Uniform Curvature," pp. 513–521.
Miyagi et al., *Technical Digest of Papers*, CLEO-83, "Optical Waveguides and Fiber Sensors," pp. 210–211.
Yeh et al., *J. Opt. Soc. Am.*, 68(9), Sep. 1978, "Theory of Bragg Fiber," pp. 1196–1201.
Miyagi et al., *Electronics Letters*, 13(10), May 12, 1977, "Transmission Characteristics of a Dielectric-Tube Waveguide with an Outer-Higher-Index Cladding," pp. 274–275.
Miyagi et al., *Journal of Lightwave Technology*, vol. LT-2, No. 2, Apr. 1984, "Design Theory of Dielectric-Coated Circular Metallic Waveguides for Infrared Transmission," pp. 116–126.
Miyagi et al., *IEEE J. of Quantum Electronics*, vol. QE-19, No. 2, Feb. 1983, "Transmission Characteristics of Dielectric-Coated Metallic Waveguide for Infrared Transmission-Slab Waveguide Model," pp. 136–145.
Miyagi et al., *Appl. Phys. Lett.*, 43(5), Sep. 1, 1983, "Fabrication of Germanium-Coated Nickel Hollow Waveguides for Infrared Transmission," pp. 430–432.
Miyagi et al., *J. Opt. Soc. Am.*, 73(4), Apr. 1983, "Waveguide Loss Evaluation by the Ray-Optics Method," pp. 486–489.
Garmire et al., *Appl. Phys. Lett.*, 31(2), Jul. 15, 1977, "Low-Loss Optical Transmission through Bent Hollow Metal Waveguides," pp. 92–94.
Christensen et al., *IEEE J. of Quantum Electronics*, vol. QE-16, No. 9, Sep. 1980, "Transverse Electrodeless RF Discharge Excitation of High-Pressure Laser Gas Mixtures," pp. 949–954.
Lovold et al., *Technical Digest of Papers*, Apr. 15, 1982, "High-repetition Rate 10-Atm Rf-Excited $CO_2$ Waveguide," p. 88.
Whitebrook et al., *Technical Digest of Papers*, Jun. 11, 1981, "High-power Military $CO_2$ Waveguide," p. 146.
Lachambre, et al., *Appl. Phys. Lett.*, 32(10), May 15, 1978, "A Transversely RF-Excited $CO_2$ Waveguide Laser," pp. 652–653.
H. Hugel et al., *Technical Digest of Papers*, Apr. 15, 1982, "Compact $CO_2$ Laser with Transverse RF-Excitation," pp. 90–91.
T. McMahon et al., *Society of Manufacturing Engineers Technical Paper*, "Waveguides for High Power $CO_2$ Lasers," pp. MR76-869.
Garmire, *Optical Spectra*, Apr. 1979, "Fiber and Integrated Optics: Waveguides in the Infrared," pp. 50–54.
Garmire et al., *Applied Optics*, vol. 15, No. 1, Jan. 1976, "Propagation of Infrared Light in Flexible Hollow Waveguides," pp. 145–150.

*Primary Examiner*—John Lee
*Assistant Examiner*—Frank González
*Attorney, Agent, or Firm*—Audley A. Ciamporcero, Jr.

[57] ABSTRACT

A hollow waveguide has an inner reflective layer such as silver, overcoated with plural layers of dielectric. Preferably three dielectric layers are used, with the inner two having quarter wave thickness, and the outer one having one half on one and one half the quarter wave thickness. Compositions for the dielectric include $ThF_4/Ge/ThF_4$, $ZnSe/Ge/ZnSe$, $Ge/ThF_4/Ge$, and $ThF_4/ZnSe/ThF_4$.

10 Claims, 6 Drawing Figures

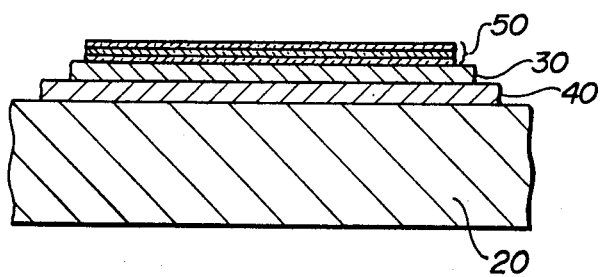
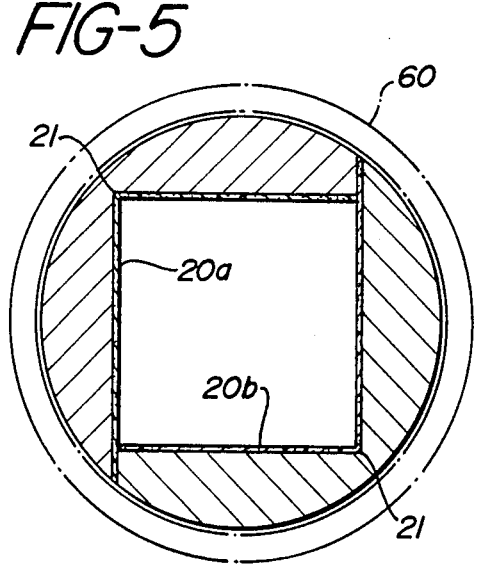
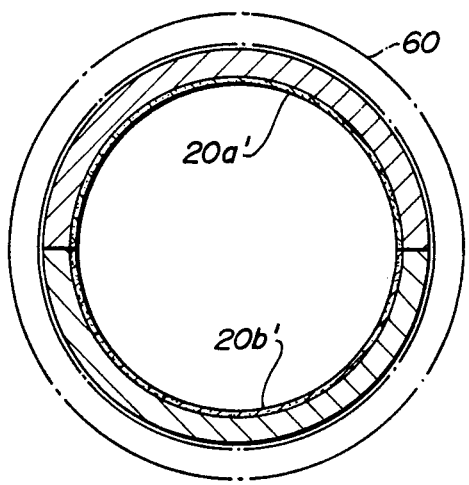

HOLLOW WAVEGUIDE HAVING PLURAL LAYER DIELECTRIC

TECHNICAL FIELD

This invention relates generally to flexible, narrow diameter, hollow waveguides and, in particular, to those capable of high efficiency transmission of $CO_2$ laser energy suitable for medical applications.

CROSS REFERENCE TO RELATED APPLICATIONS

Reference is made to concurrently filed, commonly assigned patent applications, both of K. D. Laakman, respectively entitled "Hollow Waveguide" (U.S. Ser. No. 713,149), and "Hollow Waveguides Having Disparate Dielectric Overcoatings" (U.S. Ser. No. 713,151).

BACKGROUND OF THE INVENTION

For almost as long as $CO_2$ lasers have been viable tools for medical applications, the search has been on for improved modes of guiding the laser beam to the desired operating area. For the most part, lasers have been coupled with multi-section articulated arms having any number of large bore tubular sections hinged together with a reflective surface at each hinge to permit the laser light to traverse the length of the arm and to be aimed toward the desired site.

While such articulated arm laser systems have experienced wide spread acceptance lately in a variety of medical specialities, they are generally somewhat clumsy to use since the arm typically offers some "resistance" to movement by the surgeon. Such arms are inherently limited in the scope of their medical applications, because of their size and limited flexibility. Present $CO_2$ surgical applications are essentially limited to those in which there is direct access to the area to be treated. $CO_2$ endoscope procedures are still rare, as the present technology requires a relatively wide, but short and straight endoscopic channel to "shoot" the $CO_2$ beam down. In addition, most articulated arms experience problems with beam alignment particularly if the surgical application calls for a small spot size. These arms also tend to be expensive, especially if precision optical alignment is required.

It is an object of the present invention to provide a small diameter, flexible fiber for carrying $CO_2$ laser emissions, which can be threaded down a longer, narrow or flexible endoscope, or alternatively be used as a second puncture probe.

A variety of optical fibers have been proposed as the transmission medium for laser energy, but to date, not a single one has become commercially accepted for the 10.6 micron wavelength which is characteristic of $CO_2$ lasers. Optical fibers or light pipes for the transmission of infrared light at 10.6 microns have however been proposed: in one instance a polycrystalline fiber, such as the KRS-5 fiber developed by Horiba, Ltd. of Japan; and in another, a flexible, hollow waveguide, various versions of which have been suggested by among others E. Garmire and M. Miyagi. See, for instance, M. Miyagi, et al., "Transmission Characteristics of Dielectric-Coated Metallic Waveguide for Infrared Transmission: Slab Waveguide Model", IEEE *Journal of Quantum Electronics*, Volume QE-19, No. 2, February 1983, and references cited therein. Recently, Miyagi, et al. suggested fabricating a dielectric-coated metallic hollow, flexible waveguide for IR transmission using a circular nickel waveguide with an inner germanium layer applied by rf-sputtering, plating and etching techniques. Miyagi, et al. predict extremely small transmission losses for a straight guide, but in fact, actual transmission degrades substantially with but nominal bending radii (20 cm). To understand this, the mechanism of transmission must be considered.

Transmission of laser light through a flexible, narrow diameter hollow waveguide is subject to losses largely due to successive reflections of the beam along the interior surface of the curved guide. For the size and curvatures contemplated for a medical fiber, rays will intersect the wall at angles of incidence ranging from, typically, 80° to 90°. Bending a hollow fiber increases the loss as it tends to increase the number of internal reflections and decrease the angle of incidence. In general, as the angle of incidence decreases from 90° to 80°, the loss per reflection bounce increases. It is an object of the present invention, therefore, to provide a coating which has high reflectivity over angles of incidence ranging from 80° to 90°.

A difficulty of curving metal walls is that at these angles of incidence, metals tend to exhibit high reflectivity for only the S polarization but low reflectivity ($<96\%$) for the P polarization. The losses for a 1 meter curved guide are of the order 10 dB. Garmire et al. attempted to avoid this problem by using a metal/dielectric guide in which the guide was oriented relative to the incoming beam such that the metal walls "saw" only the P polarization. This approach is flawed, however, because the dielectric walls show high reflectivity for only very, very high angles of incidence, typically in excess of 89°-requiring, in essence, that the guide must be straight along the direction of the dielectric. Some have suggested remedying this situation by overcoating a reflecting surface with a quarter-wave dielectric coating. Such a coating will yield high reflectivity for the P polarization, but low for the S polarization. Miyagi et al. attempt to strike a compromise by choosing a coating of thickness somewhere between those favoring the P and and those favoring the S polarization. He chose a germanium coating of approxiamately 0.4 to 5 micrometers in thickness. This coating yielded relatively good results ($>90\%$/meter transmission) for straight guides, but rather poor for bent guides.

This disparity appears to result from two factors: (1) The transmission with the $He_{11}$ mode in a straight guide correlates poorly with the transmission of very high multi order modes in a bent guide; and (2) The imaginary part of the refractive index of the dielectric coating is extremely crucial in the transmission of a bent guide.

It is an object of the present invention to provide dielectric overcoated waveguides which are tuned to perform well although bent in compound curvature.

SUMMARY OF THE INVENTION

We have invented a flexible, narrow outer diameter, metal coated dielectric-overcoated hollow waveguide capable of transmitting in excess of 68% of the entering $CO_2$ laser energy over a one meter section even when subjected to compound curvatures. The waveguide is sufficiently thin to be passed down the esophagus of an adult patient and is safe for endoscopic applications.

The principles of the present invention, like these in the aforementioned concurrently filed applications, are premised on dealing with refractivity as a complex (i.e., real plus imaginary) quantity, taking into account both P and S polarizations over a designated range of angles of presentation In accordance with the former aforementioned concurrently filed application, entitled simply "Hollow Metal Waveguide" (LAK-7), a flexible, narrow diameter, hollow waveguide has an outer reflective structure coated on its inner walls with suitable dielectric material of thickness equal to about one-eighth the wavelength of the light to be transmitted by the waveguide Such a dielectric construction will, on average, have relatively minimal adverse effect (i.e., loss) for both P and S polarizations, because the extinction coefficient of the complex index of refraction will have been reduced substantially over the quarter wave thickness shown in the prior art. For example, thorium fluoride ($ThF_4$) and zinc selenide (ZnSe) are disclosed as suitable dielectric materials for transmission of $CO_2$ laser emissions. In such preferred embodiments, silver is an appropriate reflecting outer layer, and the dielectric thickness may be within about 40% of an eighth wavelength in thickness.

The principles of the present invention feature plural dielectric overcoatings of select materials and thickness to promote transmission of laser energy through a flexible (i.e., bent) waveguide Preferably, three thin film coatings of two different dielectric materials will have the first and third coatings of the same, relatively low index of refraction (e.g., $ThF_4$ or ZnSe), with the intermediate layer having a relatively high index of refraction (e.g., Ge) For example, this arrangement may include the layer first contacting the beam having a thickness of either about one and one-half times ($\pm 0.2$) the thickness of a quarter wave layer, or one-half ($\pm 0.2$) of a quarter wave thickness for the laser energy in the medium of the low index dielectric. In such instance, the two inner layers have quarter wave thickness. It is also feasible to have germanium constitute the first and third layers, and $ThF_4$ constitute the intermediate layer.

BRIEF DESCRIPTION OF THE DRAWINGS

FIG. 4 is an enlarged section taken along line 4—4 of FIG. 3;

FIG. 5 is a view similar to FIG. 3 representing an alternative embodiment of the waveguide; and FIG. 6 is a view similar to FIG. 3 showing another alternative embodiment of the waveguide.

DETAILED DESCRIPTION OF THE PREFERRED EMBODIMENTS INCLUDING THE BEST MODE FOR CARRYING OUT THE INVENTION

In general, for a guide to be feasible for medical including endoscopic applications, the average reflectivity of P and S polarizations combined must be greater than 97% and preferably greater than 99% for both P and S polarizations for all angles of incidence from about 80° to about 90°. The reason for requiring a high reflectivity condition over such a broad range of angles is that a curved guide in effect introduces lower angles of incidence as the beam is propagated through the guide. The extreme angle of incidence $\phi$ that needs to be considered in a curved guide of inner cross section d and radius of curvature R is given by the relationship:

$$\phi = \cos^{-1} \sqrt{2d/R}$$

Hence, for a guide with d=1 mm and R=10 cm, the extreme incident angle is 82°. A waveguide in actual medical use will have, of course, a non-uniform radius of curvature introducing in effect even smaller incident angles. However, for a waveguide with an inner cross section diameter on the order of 1 mm the angles of incidence will normally be in the 80° to 90° range.

Figure 1:
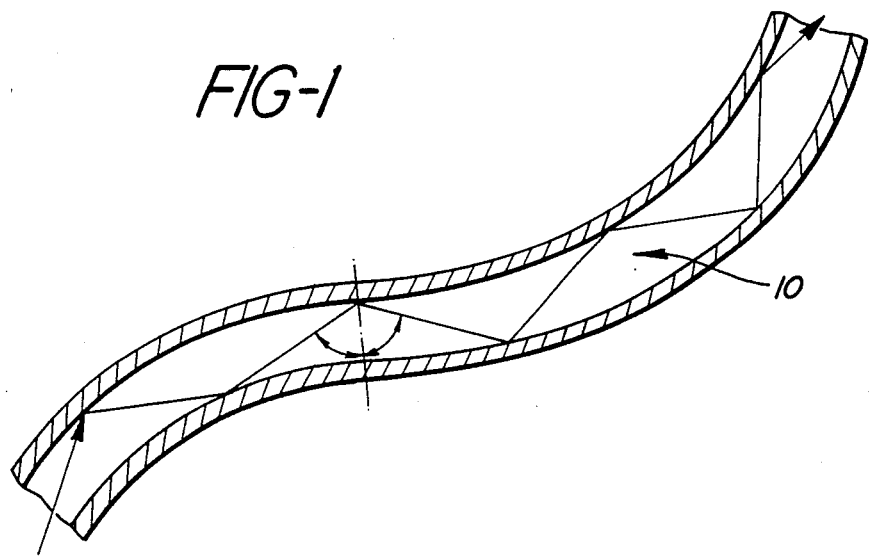
FIG. 1 is a diagrammatic representation of a section of a curved light pipe illustrating schematically the multiple reflections to which a coherent lightwave is subjected while travelling through the light pipe.
Figure 2:
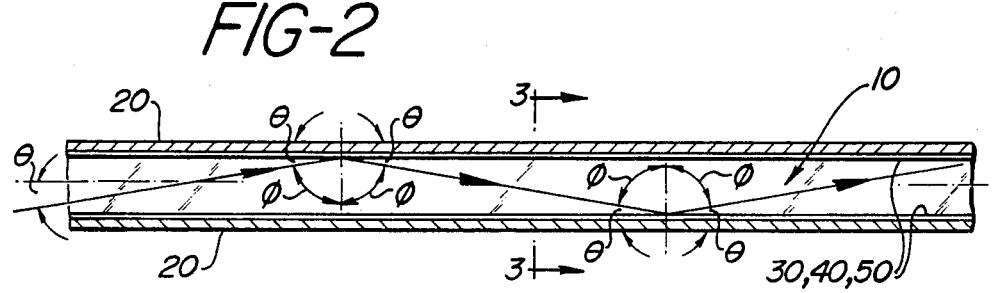
FIG. 2 is a straight section of a portion of a hollow metal waveguide according to the present invention.

In practice, a portion of the waveguide will have compound curvatures such as shown in the diagrammatic illustration of FIG. 1 wherein the laser beam, modeled in FIGS. 1 and 2 as a one dimensional ray, enters the waveguide in a direction normal to a plane orthogonally intersecting the waveguide at one end of the guide. The beam is then reflected off the interior surface of the waveguide at intervals determined by the curvature of the guide. For the types of guides under consideration, i.e., those having an inner diameter of about 1 mm and curvatures of 30 cm or less , a typical ray will hit the interior wall about every 1 to 2 cm. Hence, for a one meter length of the guide there will be about 75 reflections or bounces. Assuming an average energy loss of 0.5% per bounce, a one meter guide will transmit 68% of the light entering the guide. With just a half percent increase in loss per bounce to 1%, the overall transmission falls to about 47%.

For purposes of this application, "transmission rating" shall describe the percentage of $CO_2$ laser energy transmitted by a one meter section of a curved guide. Thus, a 68% transmission rating represents a one meter section of a guide that transmits at least 68% of the energy of a propagating $CO_2$ laser beam entering the guide after the beam is subjected to up to 75 internal reflections.

Figure 3:
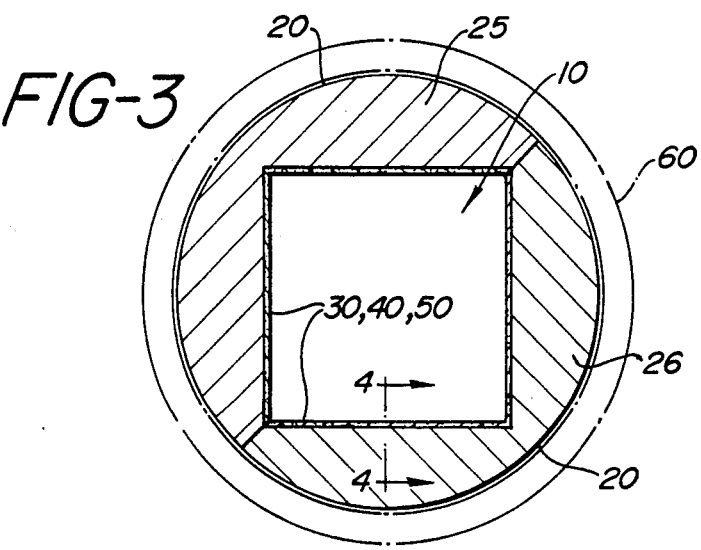
FIG. 3 is a section taken along line 3—3 of FIG. 2.

With reference to FIGS. 2, 3, and 4, there is shown various aspects of a straight line section of a flexible hollow waveguide referred to generally as 10. The waveguide includes tube 20 of a material, preferably stainless steel or aluminum, chosen on the basis of mechanical performance including ductility and strength hygroscopicity. Within the tube 20 are matable metallic halves 25 and 26 which when mated as shown form the hollow rectangular guide. ach half may he milled from a wire, and have a groove or "V" coined therein, as shown. An additional requirement of the halves 25 and 26 is that they easily coatable, for example, in a vacuum chamber by an adhesive material, to yield a low loss surface. The inner walls of the halves 25 and 26 must also be optically smooth, relative to grazing incidence at 10.6 μm. Onto the interior surface of the guide a metal coating 30 is applied. Coating 30 must be a high normal incidence reflector of light at a wavelength of 10.6 microns, such as silver. Other suitable metal coatings include gold and aluminum. The thickness of the silver coating 30 is not critical and is preferably in the range of something less than approximately 100 angstroms. To improve the bonding between silver coating 30 and the substrate 25 and 26, a high adhesion coating 40, oreferably of chromium, is applied onto the tube prior to the application of the silver coating. With the silver coating 30 bonded to the metal substrate, a multiple layer 51, 52, 53 forms a thin film dielectric coating 50.

As above stated in general terms, the present invention features a layered dielectric overcoat which is a function of $\lambda_m$, the wavelength of the light in the medium at the 80° angle of incidence. More precisely, $$\lambda_m = \frac{\lambda}{n} \frac{1}{\sqrt{1 - \frac{\sin^2 80°}{n^2}}}$$

where $\lambda$ is the wavelength of the same light in a vacuum and n is the index of refraction.

The losses obtained for a variety of dielectric coatings are influenced by the thickness of the coating as well as by N, the complex index of refraction of the material. N is given by $n+ik$, where the extinction coefficient k is the imaginary part, related to the absorption properties of the material. The real part, n, commonly referred to simply as the index of refraction, is the ratio of the speed (or wavelength) of light in a vacuum to the speed (or wavelength) of light in the material. Losses are lower as the imaginary component, k, of the refractive index is minimized. It is crucial to the performance (i.e. transmission) of the waveguide to keep the value of k to some low number. Even though k is related to the properties of the material, to a significant degree the magnitude of k is quality controllable through proper vacuum deposition techniques.

The principles of the present invention, relating to plural layer dielectrics, may be usefully considered by comparison with single layer guides in accordance with the former copending application (LAK-7). Tables 1–6 as follows, and their discussion, are duplicated from LAK-7.

As the value of k decreases, the greater the tolerance allowed on the coating thickness. For example, with a single $ThF_4$ layer with a $k=0$, thickness in the range from about $0.6\mu$ to about $2.3\mu$ (or alternatively 0.2 to 0.8 $\lambda_m/2$) will yield an average reflectivity of P and S combined greater than 99% from 80° to 90°. On the other hand, with $k=2\times10^{-3}$, the thickness may only be from about 0.4 to 0.6 $\lambda_m/2$ to still yield the same minimum limit on reflectivity Tables 1 through 3 illustrate this comparison in detail.

TABLE 1

Loss of Silver coated with $ThF_4$ with loss-less ($k = 0$) $ThF_4$.

| Angle | T = .58μ | | T = 1.16μ | | T = 1.16μ | | T = 2.23μ | | T = 2.79μ | |
|---|---|---|---|---|---|---|---|---|---|---|
| | Loss P | Loss S | Loss P | Loss S | Loss P | Loss S | Loss P | Loss S | Loss P | Loss S |
| 80 | 1.76 | .14 | .77 | .18 | .54 | .32 | .50 | .84 | .50 | 3.18 |
| 83 | 1.57 | .09 | .58 | .13 | .39 | .22 | .35 | .62 | .35 | 4.00 |
| 86 | 1.08 | .05 | .35 | .07 | .23 | .13 | .20 | .37 | .20 | 4.66 |
| 89 | .30 | .01 | .09 | .02 | .06 | .03 | .05 | .09 | .05 | 2.23 |

TABLE 2

Loss of Silver coated with $ThF_4$ of varying thickness, with $k = 2 \times 10^{-3}$.

| Angle | T = .6μ | | T = 1.2μ | | T = 1.8μ | | T = 2.4μ | |
|---|---|---|---|---|---|---|---|---|
| | Loss P | Loss S | Loss P | Loss S | Loss P | Loss S | Loss P | Loss S |
| 81 | 2.79 | .13 | 1.55 | .24 | 1.12 | .72 | 1.01 | 3.86 |
| 83 | 2.64 | .10 | 1.30 | .19 | .91 | .56 | .80 | 3.28 |
| 85 | 2.25 | .07 | .99 | .13 | .67 | .41 | .58 | 2.52 |
| 87 | 1.56 | .04 | .62 | .08 | .41 | .25 | .35 | 1.60 |
| 89 | .56 | .01 | .21 | .03 | .14 | .08 | .12 | .55 |

TABLE 3

Loss of Silver coated with $ThF_4$ of varying thickness, with $k = 10^{-3}$.

| Angle | T = .6μ | | T = 1.2μ | | T = 1.8μ | | T = 2.4μ | |
|---|---|---|---|---|---|---|---|---|
| | Loss P | Loss S | Loss P | Loss S | Loss P | Loss S | Loss P | Loss S |
| 81 | 2.46 | .13 | 1.26 | .21 | .86 | .53 | .73 | 2.57 |
| 83 | 2.32 | .10 | 1.05 | .16 | .69 | .49 | .58 | 2.18 |
| 85 | 1.98 | .07 | .80 | .12 | .51 | .30 | .42 | 1.68 |
| 87 | 1.37 | .04 | .50 | .07 | .31 | .18 | .26 | 1.06 |
| 89 | .49 | .01 | .17 | .02 | .10 | .06 | .09 | .36 |

Similar dependence of allowable coating thickness on k value can be found with ZnSe as illustrated in tables 4 and 5.

TABLE 4

Reflection loss of $A_g$ coated with ZnSe of varying thickness in which $k = 10^{-3}$.

| Angle | T = .1μ | | T = .4μ | | T = .7μ | | T = 1.0μ | |
|---|---|---|---|---|---|---|---|---|
| | Loss P | Loss S | Loss P | Loss S | Loss P | Loss S | Loss P | Loss S |
| 81 | 3.99 | .11 | 1.98 | .16 | 1.16 | .34 | .92 | 2.08 |
| 83 | 4.68 | .09 | 1.76 | .12 | .93 | .26 | .72 | 1.66 |
| 85 | 5.43 | .06 | 1.41 | .09 | .69 | .19 | .52 | 1.21 |
| 87 | 5.62 | .04 | .92 | .05 | .42 | .11 | .31 | .74 |
| 89 | 2.98 | .01 | .32 | .02 | .12 | .06 | .10 | .25 |

TABLE 5

Reflection loss of $A_g$ coated with ZnSe of varying thickness, in which $k = 10^{-3}$.

| Angle | T = .1μ | | T = .4μ | | T = .7μ | | T = 1.0μ | |
|---|---|---|---|---|---|---|---|---|
| | Loss P | Loss S | Loss P | Loss S | Loss P | Loss S | Loss P | Loss S |
| 81 | 3.97 | .11 | 1.93 | .15 | 1.09 | .32 | .82 | 1.88 |
| 85 | 5.40 | .06 | 1.37 | .09 | .65 | .18 | .46 | 1.06 |
| 89 | 2.97 | .01 | .31 | .02 | .13 | .04 | .09 | .22 |

Even with $k=0$, for high refractive indices, unacceptably high reflectivity losses occur. Germanium, for example, even with $k=0$ never yields a low loss reflectivity condition as can be seen in Table 6.

TABLE 6

Reflection loss of $A_g$ coated with Ge and varying thicknesses in which $k = 0.0$

| Angle | T = .1μ | | T = .3μ | | T = .5μ | | T = .7μ | |
|---|---|---|---|---|---|---|---|---|
| | Loss P | Loss S | Loss P | Loss S | Loss P | Loss S | Loss P | Loss S |
| 81 | 4.04 | .12 | 2.75 | .20 | 2.31 | .35 | 1.90 | 11.07 |
| 83 | 4.65 | .09 | 2.46 | .16 | 1.63 | .66 | 1.48 | 9.42 |
| 85 | 5.23 | .07 | 1.99 | .11 | 1.19 | .47 | 1.07 | 7.26 |
| 87 | 5.11 | .04 | 1.31 | .07 | .73 | .28 | .64 | 4.63 |
| 89 | 2.52 | .01 | .46 | .02 | .24 | .09 | .21 | 1.60 |

When the k values can be controlled to be less than about $2\times10^{-3}n$, it becomes advantageous from a performance view to consider multiple layer dielectrics pursuant to the present invention. There are a wide range of coating designs which, if the k value can be kept small, will yield quite acceptable results. From computer modelling, we have found a wide range of possible coatings ranging from 2 layers to 3 layers and coating thicknesses of substantial variations. Indeed, we found no way we can analytically give a convenient formula for stating the good coating design—short of actual computer modelling.

In the preferred embodiment illustrated in FIG. 4, there is shown three layers of thin film dielectric coatings with the inner and outer layers 51 and 53 being, for example, $ThF_4$ with the middle layer 52 of Ge. As shown in Table 7, Case 3, superior results are obtained for the range of incident angles 81° to 89° by reducing the coating thickness of the final (outer) $ThF_4$ layer 53 to about 40% from the $\frac{1}{4}\lambda$ thickness to about 1.67$\mu$ and using $\frac{1}{4}\lambda$ thicknesses for the other two layers 52 and 51.

TABLE 7

Percent loss of silver coated with $ThF_4/Ge/ThF_4$ stack of varying thicknesses. $k = 10^{-3}$ for all three layers.

| | Percent Loss | | | | | | | |
|---|---|---|---|---|---|---|---|---|
| | Case 1 | | Case 2 | | Case 3 | | Case 4 | |
| Angle | Loss P | Loss S | Loss P | Loss S | Loss P | Loss S | Loss P | Loss S |
| 81 | .52 | 6.07 | .52 | .90 | .61 | .20 | .99 | .07 |
| 83 | .42 | 7.14 | .42 | .73 | .50 | .15 | .76 | .05 |
| 85 | .30 | 8.44 | .31 | .54 | .38 | .11 | .59 | .04 |
| 87 | .18 | 8.74 | .19 | .33 | .23 | .07 | .38 | .02 |
| 89 | .08 | 4.76 | .06 | .11 | .08 | .02 | .13 | .01 |

Case 1: 2.79 $\mu$m, .67 $\mu$m, 2.79 $\mu$m (all three-quarter wave)
Case 2: 2.32 $\mu$m, .67 $\mu$m, 2.79 $\mu$m (all two-quarter wave)
Case 3: 1.67 $\mu$m, .67 $\mu$m, 2.79 $\mu$m (all two-quarter wave)
Case 4: 1.16 $\mu$m, .67 $\mu$m, 2.79 $\mu$m (all two-quarter wave)

As Table 7, Case 3, above suggests the maximum loss is a modest 0.61 percent at 81° and the mean loss is substantially less than 0.5 percent per reflection. Good results are also obtained using the same sequence of coatings as in the above example, but with the outermost $ThF_4$ layer 53 about 40 percent thicker than a $\frac{1}{4}\lambda$ design. As the results indicate in Table 8, the maximum loss was 0.98 percent, again at 81°.

TABLE 8

Percent loss of silver coated with $ThF_4/Ge/ThF_4$ stack of varying thicknesses.

| | Percent Loss | | | | | |
|---|---|---|---|---|---|---|
| | Case 1 | | Case 2 | | Case 3 | |
| Angle | Loss P | Loss S | Loss P | Loss S | Loss P | Loss S |
| 81 | .62 | 2.62 | .86 | .98 | 1.49 | .57 |
| 83 | .49 | 2.46 | .68 | .82 | 1.20 | .47 |
| 85 | .35 | 2.08 | .49 | .63 | .87 | .35 |
| 87 | .21 | 1.43 | .30 | .39 | .53 | .21 |
| 89 | .07 | 0.51 | .10 | .13 | .18 | .07 |

Case 1: 3.34 $\mu$m, .67 $\mu$m, 2.79 $\mu$m
Case 2: 3.90 $\mu$m, .67 $\mu$m, 2.79 $\mu$m
Case 3: 4.46 $\mu$m, .67 $\mu$m, 2.79 $\mu$m
$k_{Ge} = 2 \times 10^{-3}$
$k_{ThF_4} = 10^{-3}$ As in a single layer coating, we find extreme sensitivity to k value. Indeed, if k=0, three $\lambda_m/4$ layers of $ThF_4/Ge/ThF_4$ will yield extraordinarily low losses. As is shown in Table 9, there is a substantial increase in loss with this coating by having a finite k. If any generalization can be made, it is that at least one non-quarter wave coating is required when k values are even in the $10^{-3}$ range. So long as k/n is saller than about $1.5 \times 10^{-3}$, we found that the best of the single layer coatings were inferior to the best of the multiple layer coatings.

TABLE 9

Percent loss of Silver coated with quarter wave $ThF_4/Ge/ThF_4$ stack for $k = 0$ and finite k.

| | Percent Loss | | | |
|---|---|---|---|---|
| | Case 1 | | Case 2 | |
| Angle | P Loss | S Loss | P Loss | S Loss |
| 81 | .10 | .21 | .52 | 6.07 |
| 83 | .08 | .24 | .42 | 7.14 |
| 85 | .08 | .28 | .30 | 8.33 |
| 87 | .04 | .29 | .18 | 8.74 |
| 89 | .01 | .16 | .06 | 4.75 |

Other three layer stacks of dielectric coatings 50 were investigated besides the combination of Ge and $ThF_4$; however, these produce the best results because of the large ratios of refractive index (4.0 versus 1.35).

One combination investigated was a $ThF_4/Znse/ThF_4$ layer coated onto Ag. Here, it was found that there was quite a range of coating designs which yielded acceptable coating reflectivities, although none yielded as high performance as the optimized $Ge/ThF_4/Ge$ stack. Quite a range of acceptable designs exist. One of the best performances occur when the first layer's thickness is 1.16 (0.4 $\lambda/4$), the second layer's 1.79 (0.65 $\lambda/4$), and the third layer's 2.5 (0.9 $\lambda/4$). This particular design yields a loss of 0.85% and 0.45% for the P and S polarization, respectively. A k value of $1 \times 10^{-3}$ was assumed for each layer.

Another design considered was a $ZnSe/Ge/ZnSe$ stack coated onto a thin layer of silver. As with the other multiple layer coatings ($ThF_4/Ge_1/ThF_4$ and $ThF_4/ZnSe/ThF_4$), there are a wide range of coating designs (various layer thicknesses) which yield acceptable performances. One of the optimum coating designs with this stack are where the coatings are of the following thicknesses:

Layer 1=0.71$\mu$ (0.6 $\lambda m/4$)
Layer 2=0.69$\mu$ (1. $\lambda m/4$)
Layer 3=1.19$\mu$ ($\lambda m/4$)

With a k value equal to $10^{-3}$ for each of the three layers, the reflection loss for the P and S polarization of 81° is computed to be 0.65% and 0.17%, respectively. Another good design is:

Layer 1=0.95$\mu$ (0.8 $\lambda m/4$)
Layer 2=0.43$\mu$ (0.63 $\lambda m/4$)
Layer 3=1.19$\mu$ ($\lambda m/4$)

Here, the computed loss is 0.87% and 0.17% $\mu$ at 81°.

Regardless of choice of dielectric coating materials, the preferred geometry of the metal guide 20 is square shaped as shown in FIG. 3 and in FIG. 5. In FIG. 3, respective halves have V-shaped grooves formed therein, and the square guide results when the opposing portions are joined. The square shape is particularly advantageous for ease of fabrication since two essentially V-shaped portions 20a and 20b may be separately coated and subsequently combined to form the guide. When V-shaped sections 20a and 20b are placed in a vacuum chamber, resting on their respective pointed ends 21 with their interior surface that is to be coated facing a source of thin film dielectric, a relatively equal thickness coating by the well-known vacuum deposition technique is achievable. A generally circular cross sectional guide such as shown in FIG. 6 may also be fabricated by joining semicircular sections 20'a, and 20'b, However, the circular interior surface of sections 20'a, and 20'b, require that they be oscillated during the vacuum deposition step in order to ensure a relatively uniform thickness of the dielectric coatings.

After fabrication, the waveguide 20 is preferably inserted into a plastic or metal sleeve 60 for safety consideration should the guide ever crack during use. To enhance the ease with which metal guide 20 is encased in a plastic sleeve 60, the metal guide 20, as shown in FIG. 5, has a planar interior surface but has a circular exterior.

During fabrication, care should be taken to insure good layer-to-layer adhesion with minimal mechanical stresses in and among the layers. Excessive mechanical stresses will at the least degrade performance, and might even cause the coatings physically to fracture and flake. Stress conditions will be a function of material selection, coating thickness, and the coating process. For example, $ThF_4$ and Ge both are characterized by tensile stress, and thus in combination are more apt to have poor layer-to-layer adhesion. On the other hand, ZnSe is characterized by lower tensile stress, which favors its combination with either $ThF_4$ or Ge.

I claim:

1. A flexible hollow waveguide for high efficiency transmission of $CO_2$ laser light which comprises:
   (a) a guide having an internal surface and an external cross section sufficiently small to allow for endoscopic application;
   (b) a metal coating applied to the internal surface of said metal guide, said coating characterized by a high degree of reflectivity of light at normal incidence for the waveglength of use;
   (c) a plural layer dielectric coating applied to said metal coating, said coating composite having the reflectivities of the P and S polarization averaged together to be in excess of 98.5% for all angles of incidence ranging from 80° to 90°.

2. The hollow waveguide according to claim 1 wherein said guide is made of aluminum and said metal coating is silver.

3. The hollow metal waveguide according to claim 1 wherein the interior cross section of the waveguide is square shaped.

4. The hollow metal waveguide according to claim 1 wherein the interior cross section of the waveguide is circular.

5. A waveguide as described in claim 1 and comprising three said layers of dielectric, first and third ones of which being a first dielectric material, and a middle one of which being a second dielectric material.

6. A waveguide as described in claim 5 wherein said first dielectric material has an index of refraction which is relatively low in comparison with the index of refraction of said second dielectric material.

7. The hollow waveguide according to claim 5 wherein the first and third layers are $ThF_4$ and the second laver is selected from the group consisting of ZnSe and Ge.

8. The hollow waveguide according to claim 5 wherein the first and third layers are ZnSe and the second coating is Ge.

9. The hollow waveguide according to claim 5 wherein said first and third layers are Ge and the second layer is $ThF_4$.

10. A waveguide as described in claim 5 wherein said outermost of said dielectric layers has a thickness between approximately one-eighth and three-eighth of the wavelength of light in said outermost layer.

* * * * *